United States Patent [19]

Wakai

[11] 4,380,058
[45] Apr. 12, 1983

[54] STAGE TRACER

[75] Inventor: Katsuro Wakai, Hadano, Japan

[73] Assignee: Hitachi, Ltd., Tokyo, Japan

[21] Appl. No.: 231,900

[22] Filed: Feb. 5, 1981

[30] Foreign Application Priority Data

Feb. 6, 1980 [JP] Japan .................................. 55-12516

[51] Int. Cl.³ .............................................. G11C 7/00
[52] U.S. Cl. .................................................. 365/244
[58] Field of Search ......................................... 365/244

Primary Examiner—George G. Stellar
Attorney, Agent, or Firm—Antonelli, Terry & Wands

[57] ABSTRACT

A stage tracer comprising a plurality of tracing units which are physically independent of one another and each of which includes a memory unit and the associated read/write control logic unit, and a common control unit provided physically independent of and electrically connected with the tracing units, to supply desired control signals to the respective read/write control logic units. In each tracing unit, under the control of the common control unit, the read/write control logic unit causes the signals to be observed to be written in the memory unit and also causes the content of the memory unit to be read out onto the data bus common with all the tracing units.

2 Claims, 3 Drawing Figures

STAGE TRACER

BACKGROUND OF THE INVENTION

The invention relates to a stage tracer used in an information processor to obtain information about errors occurring in the information processor.

The stage tracer stores the intermittent or solid changes in the internal signals of the information processor, i.e. the signals indicating the instantaneous operating conditions of the registers and the controlling flip-flop in the information processor, in a memory. When an abnormal phenomenon such as an error happens, the stage tracer stops the writing operation in the memory and then provides error information useful in analyzing causes of errors by delivering the content of the memory.

In a conventional stage tracer, the internal signals (i.e. signals to be observed) appearing at the various points in the information processor are transferred through signal lines from their source points to the memory. Namely, only one memory is provided in a suitable position in the information processor and all the internal signals are gathered and stored in the memory. In general, the memory should preferably have a capacity of several hundred words (about several hundred bits/word).

The conventional stage tracer of this type, however, can not be free from the following problems and therefore remains to be improved.

Namely, the number of the signal lines for transmitting internal signals from the flip-flops or the selected registers in the packages to the common memory must be equal to the number of the internal signals themselves, i.e. as many as more than several hundreds. Also, more than several hundred connector pins are needed for signal lines in the packages so that the assembly process and wiring process become complicated, the resulting product being disadvantageous from the standpoint of cost. Moreover, the signal lines to be used must be rather long. Accordingly, the signals tend to be attenuated or noises are apt to be mixed into the signals. To prevent these tendencies, the signals must be passed through gates, which serve as amplifiers, before being sent through the signal lines. Furthermore, the lengths of the signal lines vary depending upon the respective internal signals, i.e. the positions of the packages from which the internal signals are taken out, and therefore the internal signals indicative of the operating conditions of registers and flip-flops at the same time point reach the memory at different instants so that an exact record of internal signals is impossible. Consequently, some measures should be taken to provide phase-controlling flip-flops for the respective internal signals so as to be able to write all the internal signals in the memory simultaneously. Thus, the conventional stage tracer, which needs amplifying gates and flip-flops, incurs an increase in the cost associated with the transmission of the internal signals. Moreover, since the internal signals are transferred through long signal lines, it often happens that the waveforms of the internal signals are distorted and that an exact record of the internal signal becomes impossible. This means that errors cannot be correctly recorded and therefore that the causes of the errors cannot be properly analyzed.

FIG. 1 schematically shows a conventional stage tracer as described above.

In FIG. 1, an internal signal (1) sent from a register or a control flip-flop provided in a package 7 mounted on a mother board 13, is further sent through a timing phase controlling flip-flop 1 and an amplifying gate 2 and then taken in a cable package 8 provided on the board 13. The internal signal (1) is then transmitted through a signal line (i.e. cable) 16 to a cable package 9 mounted on a board 14 and further to a memory package 10 mounted on the board 14. A series of internal signals thus taken in the memory package 10 are simultaneously set in a write data register (hereinafter referred to write register) 4 and then written in a common memory 5. On the other hand, an internal signal (2) in a package 11 mounted on a board 15 is in phase with the setting timing of the register 4 and therefore a phase control flip-flop need not be provided. The internal signal (2) is taken out of the package 11 via an amplifying gate 6, sent through a cable 17 connecting a cable package 12 with the cable package 9 to the memory package 10, and written in the memory 5 through the write register 4. Other internal signals from the packages 7 and 11 and from packages not shown are written in the memory 5 in like manner. Now, a reference numeral 18 designates a connecter pin.

SUMMARY OF THE INVENTION

The object of this invention is to provide a stage tracer free from the above described drawbacks incidental to the conventional stage tracer.

To attain this object, the stage tracer according to this invention employs a discrete type structure which comprises plural tracing units each including a memory and the associated read/write control logic unit, and a common control unit for controlling the tracing units.

Namely, memory devices are not concentrated at a place in the circuit, but discretely provided in the respective tracing units. Signals to be observed are directly written in the memories of the associated tracing units. The tracing units are so interconnected that the contents of the memories in the respective tracing units may be sequentially read onto a data bus which is in common with all the tracing units. The operation of writing or reading internal signals in or out of the memory in one tracing unit is performed by the read/write control logic unit incorporated in the tracing unit in question under the control of the common control unit.

Such a discrete type stage tracer as described above, embodying this invention can be realized with ease and at low cost through the recently developed semiconductor technology. Namely, a single tracing unit comprising a memory and the associated read/write control logic unit is formed in a single chip and this chip, like an ordinary logic element, is mounted on a package in the information processor, which package contains internal signals to be observed. With this configuration, internal signals can be directly written in the associated memory without any amplifying gate and phase-controlling flip-flop and yet the internal signals can be recorded with high fidelity. This constitution is also advantageous from the standpoint of cost. The signal lines between the tracing units and the common control unit consist only of signal lines for controlling the reading and writing and a data bus in common with all the tracing units and therefore the number of the signal lines used in this invention is smaller than that of the signal lines used in the conventional stage tracer. According to this invention, a data bus consisting of only one signal line can suffice for an embodiment of the smallest scale. Also, since each tracing unit has its read/write control logic unit, the number of signal lines for read/write controls can be lessened. Thus, according to this invention, the stage tracer of discrete type needs a much smaller number of signal lines than the conventional stage tracer which requires about several hundred signal lines for the transmission of internal signals. Accordingly, the number of pins of each package can also be leassened.

DESCRIPTION OF THE PREFERRED EMBODIMENT

An embodiment of this invention, i.e. a discrete type stage tracer, will now be described with the aid of the attached drawings.

Figure 1:
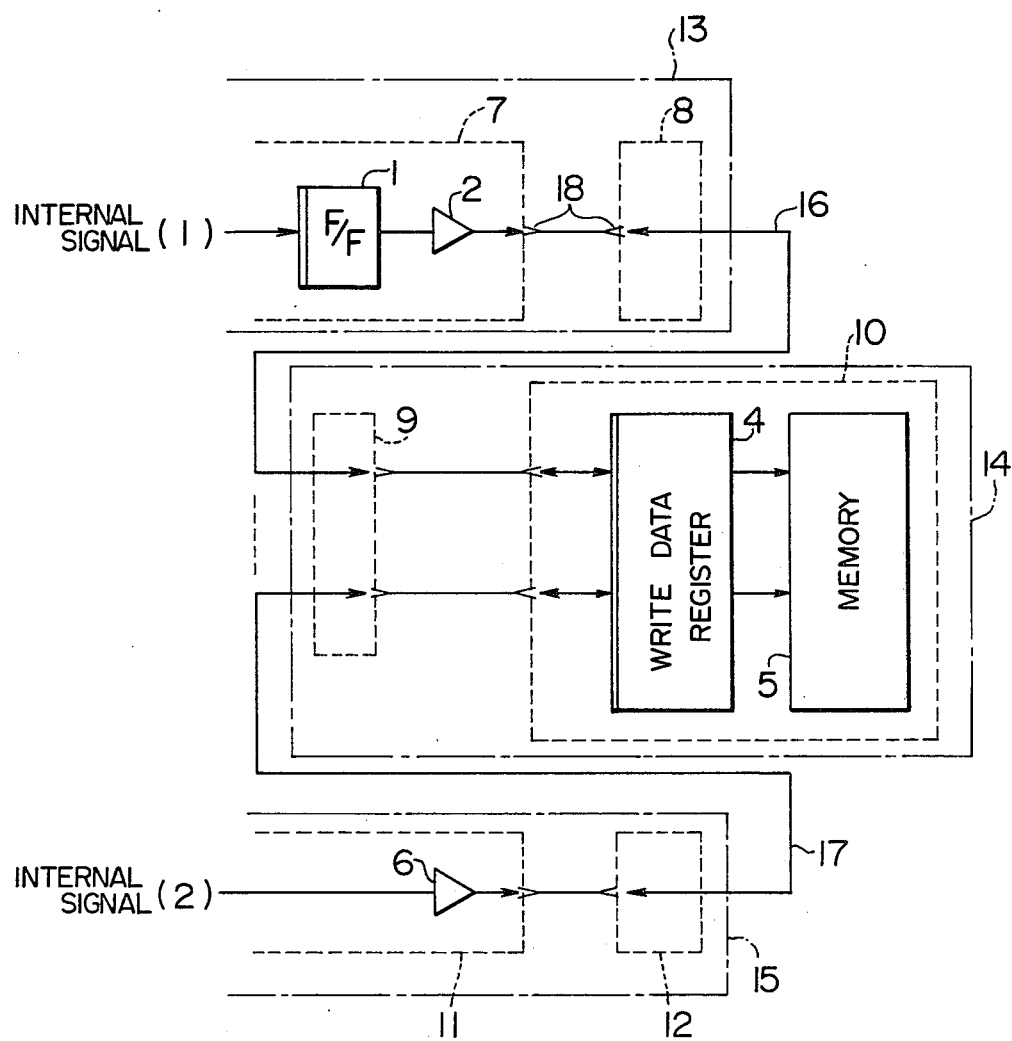
FIG. 1 schematically shows the structure of a conventional stage tracer.
Figure 2:
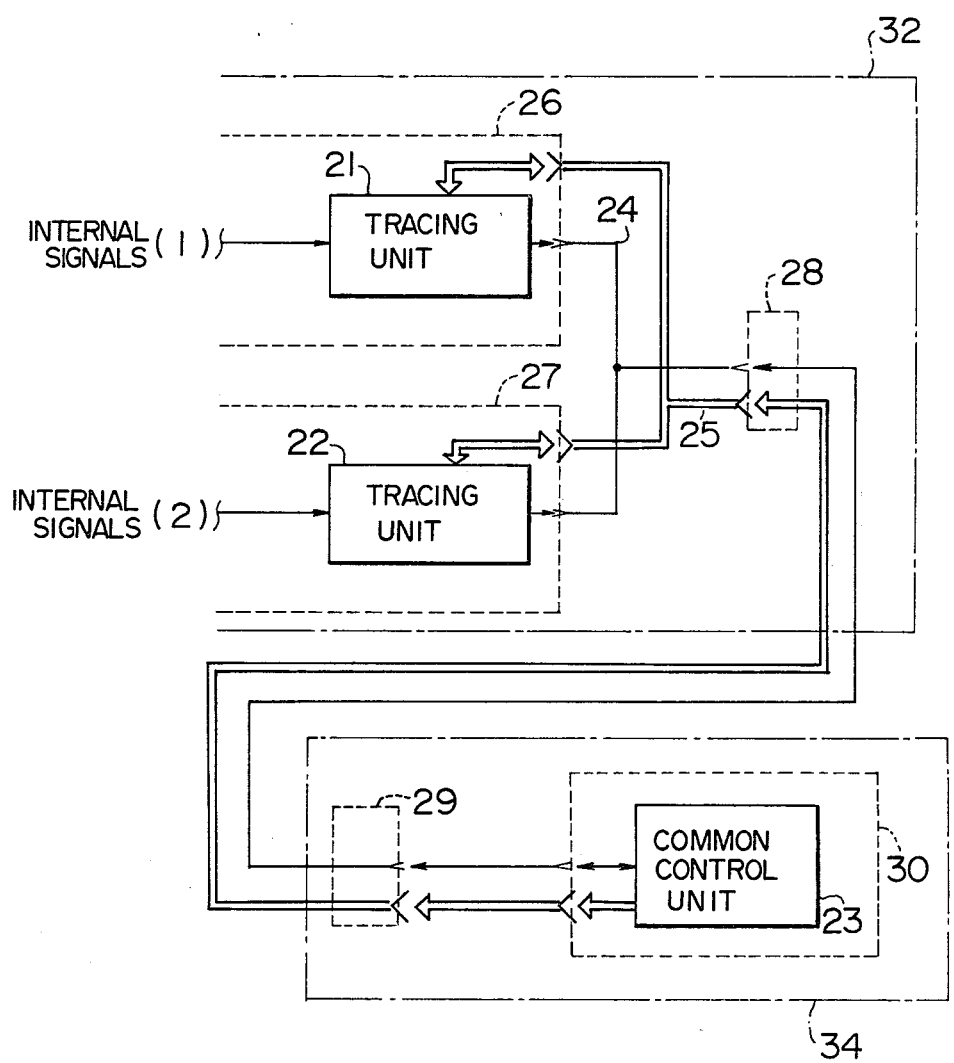
FIG. 2 schematically shows the structure of a discrete type stage tracer as an embodiment of this invention.

FIG. 2 schematically shows the structure of a discrete type stage tracer as an embodiment of this invention. Reference numerals 21 and 22 indicate tracing units mounted respectively on packages 26 and 27 in which internal signals or signal groups (1) and (2) to be observed in the information processor appear. In this embodiment, it is assumed that the packages 26 and 27 are mounted on a mother board 32. For the convenience of description, only two tracing units are shown in FIG. 2, but in practical applications more tracing units are needed and usually mounted on the packages provided on other boards. The tracing units 21 and 22 are connected, through control signal line group 25 and a line (or lines) 24 serving as a data bus and via a cable package 28 on the board 32 and a cable package 29 on a board 34, with a common control unit 23 mounted on a package 30.

Each of the tracing units 21 and 22 comprises a memory having a capacity of several words (several bits per word) and the associated read/write control logic unit. The common control unit 23 delivers write and read instructions for the respective tracing units through the control signal line group 25. Since the internal signal groups (1) and (2) are directly supplied respectively to the tracing units 21 and 22 through no transmission lines, amplifying gates and phase-controlling flip-flops need not be inserted. The content of the memory of each tracing unit 21 or 22 is serially read out, e.g. biy by bit, onto the data bus 24 under the control of the common control unit 23. The common control unit 23 edits the data bits on the data bus 24 into a word for the stage tracer and then delivers the edited word to an external apparatus such as, for example, a console printer or a display console through an I/O unit not shown.

Figure 3:
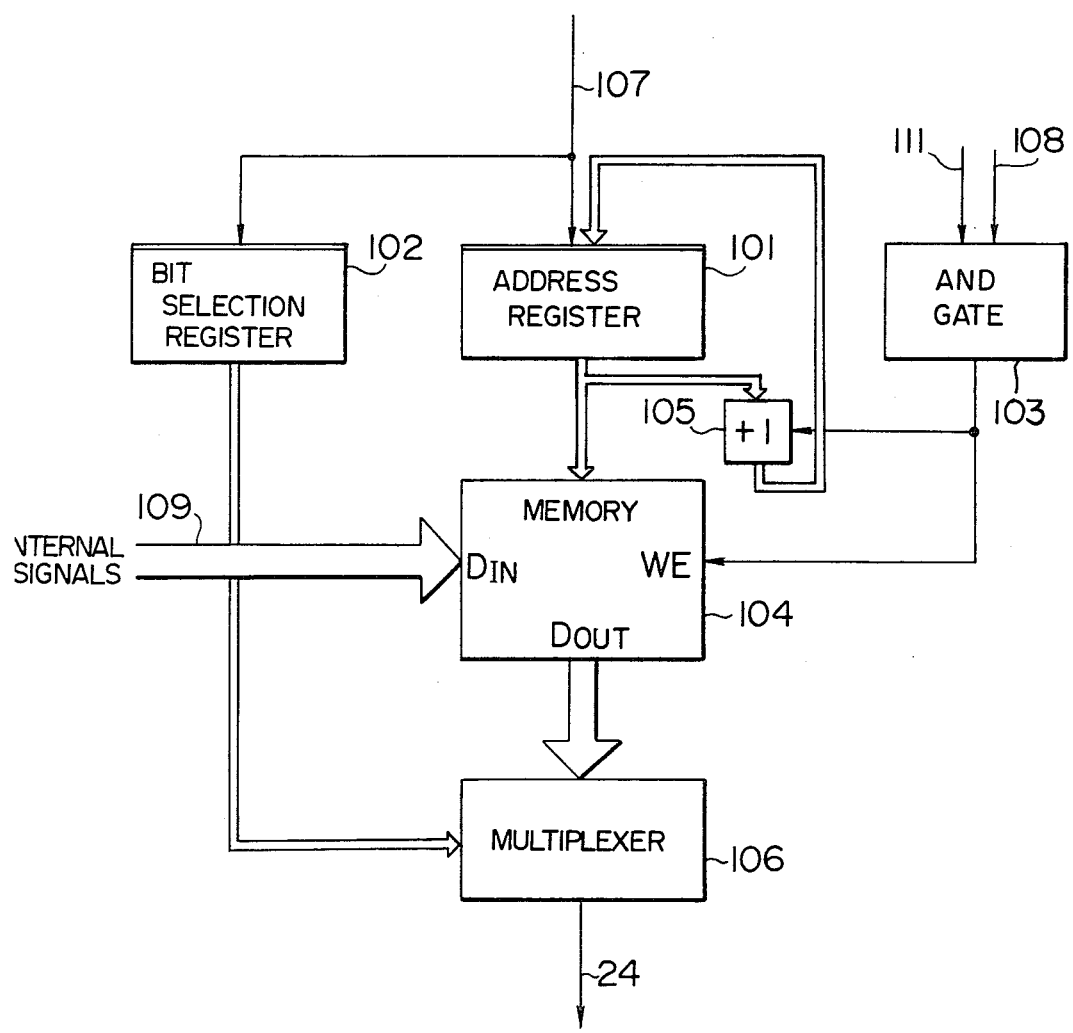
FIG. 3 shows in block diagram a concrete example of the tracing unit used in the stage tracer shown in FIG. 2.

FIG. 3 shows a concrete and preferable example of the tracing unit described above.

Reference numeral 104 indicates a memory such as a RAM and as its read/write control logic unit are provided an address register 101, a bit selection register 102, an AND circuit 103, +1 circuit 105 and a multiplexer 106. The AND circuit 103 receives a write mode line 111 and a write timing line 108 of the control signal line group 25. The address register 101 and the bit selection register 102 receive address line 107. The output of the multiplexer 106 is connected with, a data bus 24 of, for example, one signal line. In the write mode in which internal signals are to be written in the memory 104, a signal "1" is delivered onto the write mode line 111 and timing pulses are supplied to the timing line 108 so as to provide the optimal timing for simultaneously writing all the internal signals sent through a signal line group 109 in the associated tracing unit. As a result, a write pulse "1" is supplied from the AND circuit 103 to the WE (write enable) terminal of the memory 104 so that the internal signals supplied to the $D_{IN}$ terminal are sequentially written in the memory 104 in response to the write pulse. At this time, address information for specifying a write address for the memory 104 is supplied bit-serially to the address register 101 through the address line 107 so that the address register 101 accesses an address of the memory. Accordingly, the internal signals are simultaneously stored in the predetermined addresses in response to the write pulse.

The internal signals thus written in are the signals indicative of the operating conditions at the same time point of the selected registers and flip-flops on the package on which the tracing unit associated with the internal signals in question is mounted. The write pulse is so supplied at a suitable timing to each tracing unit that all the internal signals supplied to the unit are simultaneously written in the associated memory. The content of the address register 101 is applied to the +1 circuit 105 and incremented by unity (+1) thereby. The incremented value is applied to the address register 101 in response to the write pulse and set therein. The address register 101 accesses the next address of the memory 104. Accordingly, the internal signals indicative of the operating conditions at the next time point of the selected registers and flip-flops are simultaneously written in the addresses specified by the content of the address register 101 in response to the next write pulse. Thus, when internal signals are written sequentially in all the addresses in the memory 104, the content of the address register is restored to the first value and then the succeeding internal signals are again written in the first, second, . . . and the last addresses sequentially. In this case, the formally written contents are sequentially erased in response to the writing of the comming internal signals.

In this way, while the information processor is normally operating, internal signals are sequentially written in the memory 104 in each tracing unit. The memory 104 therefore stores internal signals written therein during a period of time determined depending on its memory capacity.

When an error in a register or a flip-flop of the information processor is detected, the common control unit 23 causes the signal on the write mode line 111 to take a value "0" so that the read mode is assumed in which the internal signals stored in the memory are to be read out. In this read mode, the address information delivered by the common control unit 23 and sent bit-serially through the address line 107 is sequentially set in the address register 101 and the bit selection register 102. First, the content of the address in the memory 104, specified in accordance with the content of the address information set in the address register 101 (i.e. internal signals indicative of operating conditions at a time point) is read out of the output terminal $D_{OUT}$ and supplied to the multiplexer 106. At this time, the bit selection register 102 sequentially specifies the output of the multiplexer 106 in response to the address information sent thereto through the address line 107. The multiplexer 106 selects one bit out of the read data and deliver it to the common control unit 23 through the data bus 24, which one bit is specified by the bit selection register 102. All the bits read out of the memory 104 into the multiplexer 106 are therefore delivered onto the data bus 24. Now, only a part of the bits read out into the multiplexer may be selectively delivered on the data bus 24. The address signal specifying the next address is applied to the address register 101 through the address line 107 and therefore the internal signals at the next time point are read out of the memory 104 and then supplied to the multiplexer 106. The bits delivered from the multiplexer 106 are sequentially specified by the bit selection register 102 and supplied onto the data bus 24. After all the contents of the memory 104 have been read out and supplied to the common control unit 23, they are then supplied for analysis to an external apparatus (e.g. printer or display console) through an I/O unit not shown. Now, since the write signal is not delivered in the read mode, the +1 circuit does not deliver any signal to the address register.

In the above embodiment, only one signal line is used as a data bus and the bits set in the multiplexer 106 must be read out bit by bit, that is, only one bit must be read out at a time, onto the data bus 24. However, if plural signal lines are used as a data bus, it is possible to read out several bits from the multiplexer at a time and to supply them onto the data bus. In that case, the plural bits delivered at a time may indicate the internal signals indicative of the operating conditions of the selected registers and flip-flops at a time point. Now, only a part of the data stored in the memory may be selectively read out on the data bus 24.

As described above, according to the discrete type stage tracer embodying this invention, the internal signals of an information processor can be recorded with high fidelity and moreover the reduction of the cost of the resultant product can be easily achieved.

I claim:

1. A stage tracer comprising:
a plurality of tracing units which are physically independent of one another, each tracing unit including a memory unit having terminals for receiving signals to be observed and a read/write control logic unit for controlling the writing and reading of data into and out of said memory unit;
a common control unit provided physically independent of said tracing units and connected electrically with said tracing units through a signal line group, to supply the control signal desired to said read/write control logic units of said tracing units through said signal line group; and
a data bus for connecting the outputs of said tracing units with said common control unit, wherein said read/write control logic units cause said signals to be observed to be written in the corresponding memory units and also cause the contents of said memory units to be sequentially read onto said data bus through the output terminals of the corresponding tracing units in response to said control signals from said common control unit.

2. A stage tracer as claimed in claim 1, wherein said signal line group includes write timing lines, write mode lines and address lines, and each of said control logic units comprises an AND gate receiving a write timing line and a write mode line, an address register receiving an address line, a bit selection register, a +1 circuit connected between the input and output of said address register to increase the content of said address register by unity (+1) and to set the increased content again in said address register, and a multiplexer connected with the output of said memory unit, and
wherein said AND gate supplies a write pulse to said memory unit in response to the write mode signal and the write timing signal; said address register specifies the address in said memory unit corresponding to the address information sent through said address line; said memory unit causes said signals to be observed to be written in the specified address in said memory unit in response to said write pulse and then causes the content of said specified address to be delivered to said multiplexer; said bit selection register specifies which one of the bits in said multiplexer is to be delivered, in response to said address information; and said multiplexer delivers onto said data bus the bit specified by the content of said bit selection register.

* * * * *